United States Patent
Bank et al.

(10) Patent No.: US 9,135,332 B2
(45) Date of Patent: Sep. 15, 2015

(54) VISUAL OBJECT PRIORITIZATION

(75) Inventors: Judith H. Bank, Durham, NC (US); Lisa M. Wood Bradley, Cary, NY (US); Lin Sun, Research Triangle Park, NC (US); ChunHui Yang, Research Triangle Park, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1627 days.

(21) Appl. No.: 12/478,280

(22) Filed: Jun. 4, 2009

(65) Prior Publication Data

US 2010/0313140 A1    Dec. 9, 2010

(51) Int. Cl.
G06F 3/00 (2006.01)
G06F 17/30 (2006.01)
G06F 15/173 (2006.01)

(52) U.S. Cl.
CPC ............ G06F 17/30702 (2013.01); G06F 3/00 (2013.01); G06F 15/173 (2013.01)

(58) Field of Classification Search
CPC ................................ G06F 3/00; G06F 15/173
USPC ........................................... 715/747; 709/204
See application file for complete search history.

(56) References Cited

U.S. PATENT DOCUMENTS

| | | | |
|---|---|---|---|
| 7,353,234 B2 | 4/2008 | Kimball et al. | |
| 7,451,194 B2* | 11/2008 | Bowser et al. | 709/219 |
| 2004/0225995 A1* | 11/2004 | Marvin et al. | 717/100 |
| 2005/0044508 A1* | 2/2005 | Stockton | 715/811 |
| 2005/0177815 A1 | 8/2005 | Kurz et al. | |
| 2006/0026557 A1 | 2/2006 | Petri | |
| 2006/0048053 A1 | 3/2006 | Sembower et al. | |
| 2007/0060083 A1 | 3/2007 | Oh et al. | |
| 2007/0061707 A1 | 3/2007 | Sally et al. | |
| 2007/0089047 A1 | 4/2007 | Joshi | |
| 2007/0282673 A1 | 12/2007 | Nagpal et al. | |
| 2008/0127133 A1 | 5/2008 | Aghara et al. | |

OTHER PUBLICATIONS

Donnelly, "Community Portals Through Communitization", ACM Conference on Universal Usability, 2003, pp. 9-14.
Steiner, "Developing Documentation Systems for Pervasive Network Environments", ACM Special Interest Group for Design of Communication, 2005, pp. 85-88.
He et al, "Uni-Grid P&T: A Toolkit for Building Customizable Grid Portals", ICWS-Europe 2003, LNCS 2853, pp. 198-212, 2003.

* cited by examiner

*Primary Examiner* — Peiyong Weng

(74) *Attorney, Agent, or Firm* — Cuenot, Forsythe & Kim, LLC

(57) ABSTRACT

A system, method and program product for prioritizing visual objects for a configurable interface. A system is provided that includes a computer system having: a grouping system for defining a group of members and for assigning weights to members of the group; a behavior analysis system for collecting behaviors of the members of the group; and a prioritization system that prioritizes visual objects based on the collected behaviors and weights assigned to the members of the group.

17 Claims, 4 Drawing Sheets

VISUAL OBJECT PRIORITIZATION

FIELD OF THE INVENTION

This disclosure is related to a system and method for automatically configuring visual objects in a graphical user interface (GUI), and more particularly to a system and method of prioritizing the presentation of visual objects, such as portlet windows, based on the behavior patterns of other users in a defined group.

BACKGROUND OF THE INVENTION

In a given online social or work interface, such as a social networking web site, a web portal page, an integrated development environment (IDE), etc., users often have the capability of customizing their views. Thus, for example, on a news portal web page, a user may want to see sports scores and stories at the top, followed by entertainment news and stories, and then headline news stories. Another user may want prioritize financial news stories and information at the top of the page, followed by world news, etc. Similarly, in an IDE, a team leader may want to see high level data in a main window, while a programmer may want to see program code in the main window.

The use of configurable interfaces, such as portals and IDEs, allows for such customization of views. Portlets are pluggable user interface software components that are managed and displayed in a web portal. Portlets produce fragments of markup code that are aggregated into a portal page. Typically, following the desktop metaphor, a portal page is displayed as a collection of non-overlapping portlet windows, where each portlet window displays a portlet. Hence a portlet (or collection of portlets) resembles a web-based application that is hosted in a portal. Examples of portlet applications are email, weather reports, discussion forums, and news.

Unfortunately, with the ever growing number of online sites that a given user may frequent, taking the time to customize each portal or configurable interface may become overly burdensome. For instance, if the user is only a casual or infrequent user of a site, he may not be inclined to customize the portal page. Further, if the user is new to a site, the user will be presented with a default view that may not be the most useful presentation of information for the user.

SUMMARY OF THE INVENTION

The present invention relates to a system, method and program product for automatically prioritizing visual objects, such as portlet windows, within a configurable interface, such as a portal. In a first aspect, there is a visual object processing system for prioritizing visual objects for a configurable interface, comprising: a computer system comprising: a grouping system for defining a group of members and for assigning weights to members of the group; a behavior analysis system for collecting behaviors of the members of the group; and a prioritization system for prioritizing visual objects based on the collected behaviors and weights assigned to the members of the group.

In a second embodiment, there is a method of prioritizing visual objects for a configurable interface, comprising: defining a group of members and assigning weights to members of the group using a computing device; collecting behaviors of the members of the group; prioritizing visual objects based on the collected behaviors and weights assigned to the members of the group using the computing device; and providing the visual objects for display on a display device.

In a third embodiment, there is a computer readable medium having a computer program product stored thereon, which when executed by a computer device, prioritizes visual objects for a configurable interface, comprising: program code for defining a group of members and assigning weights to members of the group; program code for collecting behaviors of the members of the group; and program code for prioritizing visual objects based on the collected behaviors and weights assigned to the members of the group.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
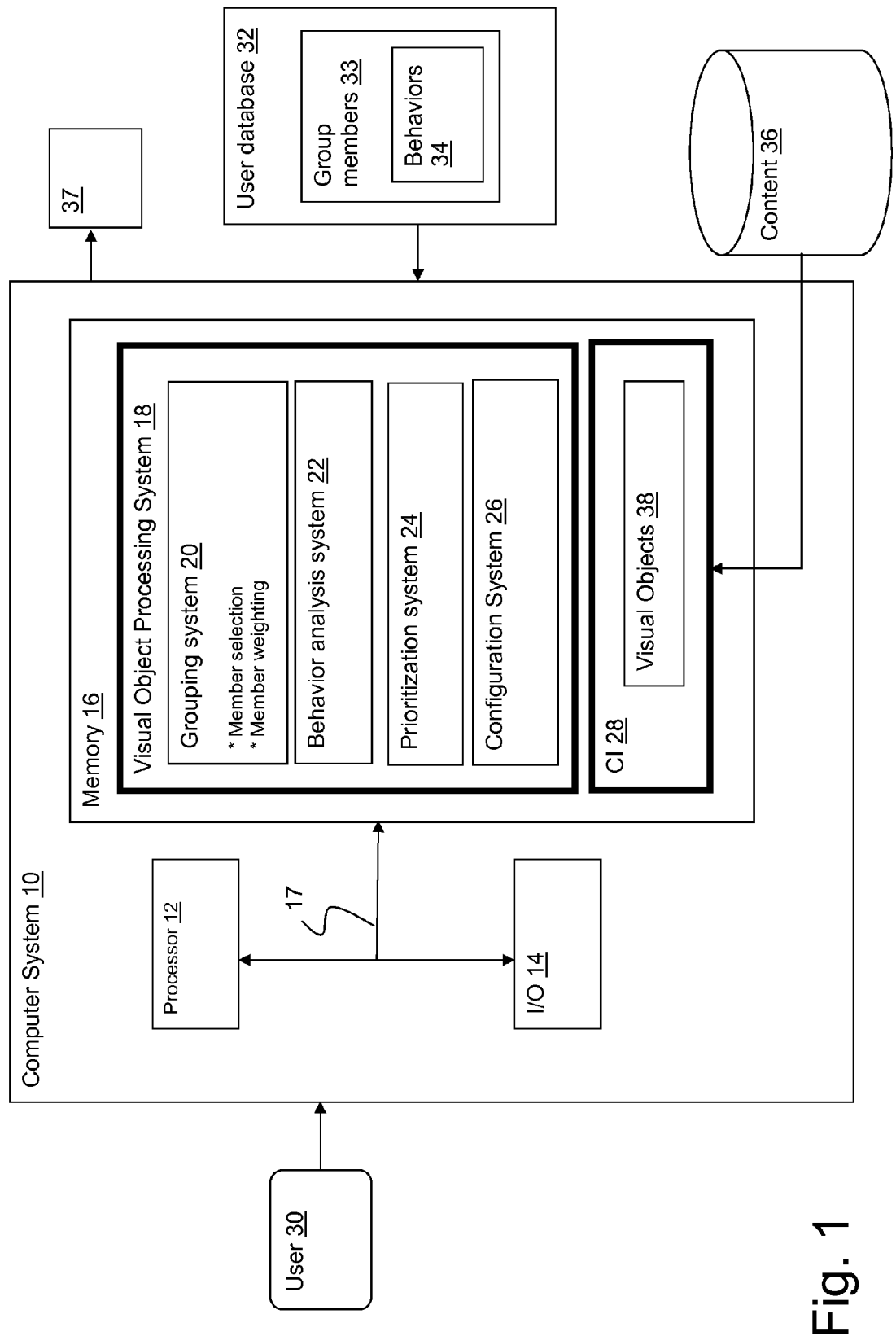
FIG. 1 depicts a computer system having a visual object processing system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The invention provides a solution to automatically prioritize visual objects (e.g., portlet windows, IDE windows, links, advertisements, widgets, etc.) within a configurable interface (e.g., a portlet page, an IDE platform, a social network page, a picture web site, a home page, etc.) for a user. As described herein, the user is associated with one or more groups, whose member's behaviors are analyzed and weighted to determine prioritization of the visual objects.

Referring now to FIG. 1, a computer system 10 having a visual object processing system 18 is shown that automatically prioritizes visual objects 38 for display within a configurable interface (CI) 28 for a user 30. CI 28 may be displayed on any type of display device 37, such as a monitor, handheld device screen, etc. As noted, visual objects 38 may comprise any type of displayable object. In some cases, such as a portlet window, the visual object may display content 36 received over a network, such as the Internet. Visual object processing system 18 generally includes a grouping system 20 for allowing a user 30 or automated process to select and weight group members 33 of one or more associated groups; a behavior analysis system 22 for analyzing behaviors 34 of group members 33; a prioritization system 24 for prioritizing visual objects 38 based on the analyzed behaviors 34 and weights; and a configuration system 26 for automatically arranging visual objects 38 within the configurable interface 28 for the user.

Figure 2:
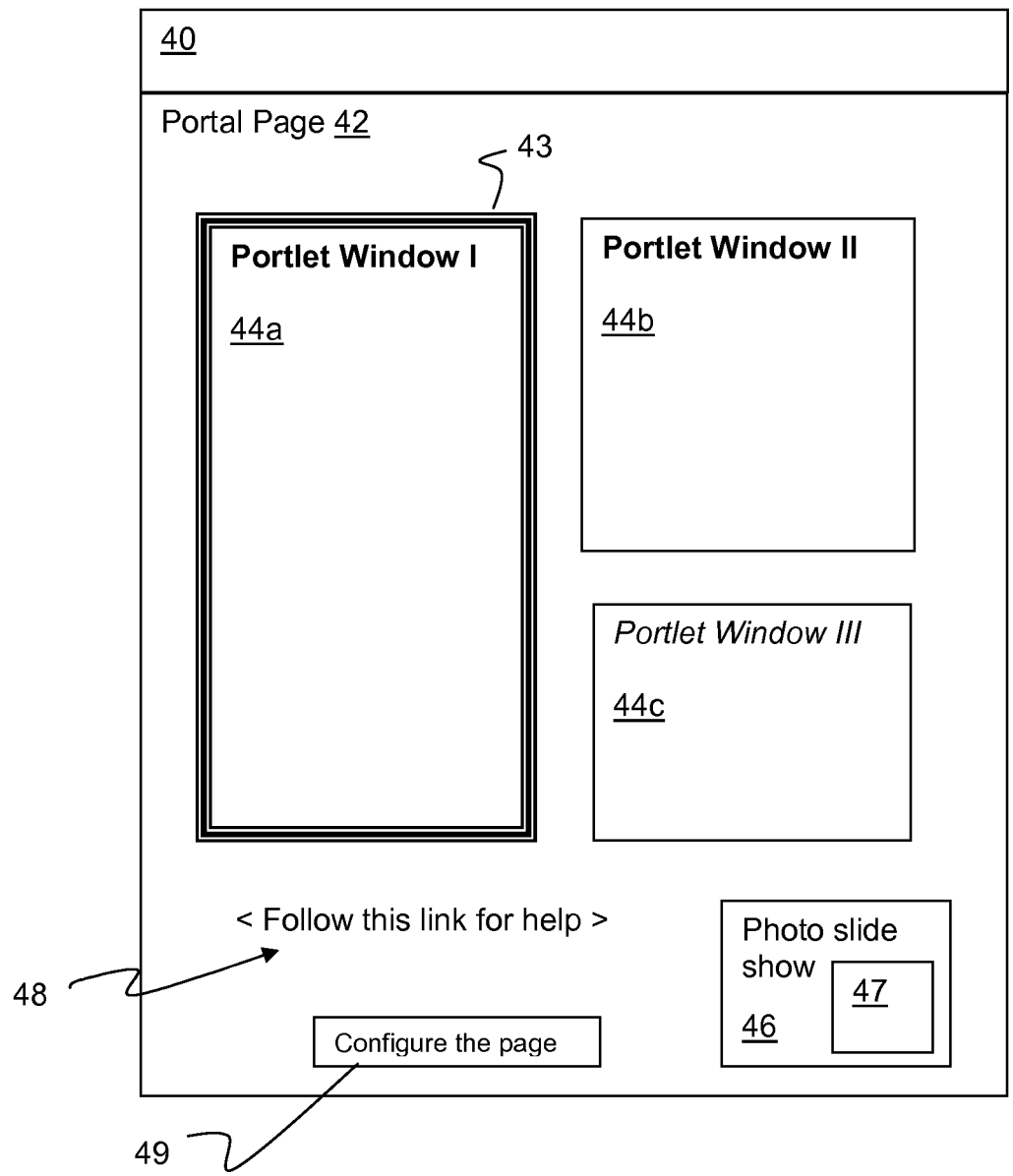
FIG. 2 depicts an illustrative display device showing visual objects in accordance with an embodiment of the present invention.

FIG. 2 depicts an illustrative display device having a configurable interface 40 comprising a portal page 42 that was configured by computer system 10 (FIG. 1). In this example, portal page 42 displays various visual objects, including: three portlet windows 44a, 44b, and 44c, a photo slide show 46, a link 48, and a manual configuration button 49. Visual object processing system 18 (FIG. 1) automatically determines one or more of the placement, size, order, appearance, font style/size, color, etc., of each visual object for the user 30 based on a determined priority of visual objects available for the configurable interface 40. Obviously, the type, size, placement, and configurability of the visual objects can vary and are not intended to be limited to those shown in FIG. 2.

As can be seen, Portlet Window I (44a) is shown in the largest window on the left of the portlet page 42, highlighted with a border 43, reflecting a high priority. Conversely, photo slide show 46, having a relatively lower priority is placed in a smaller window at the lower right. Note that in the photo slide show 46, the default starting picture 47 and/or order of pictures could likewise be prioritized by the visual object processing system 18. Also note that a manual configuration button 49 is provided to allow the user 30 to manually edit the appearance of the portal page 42.

Figure 3:
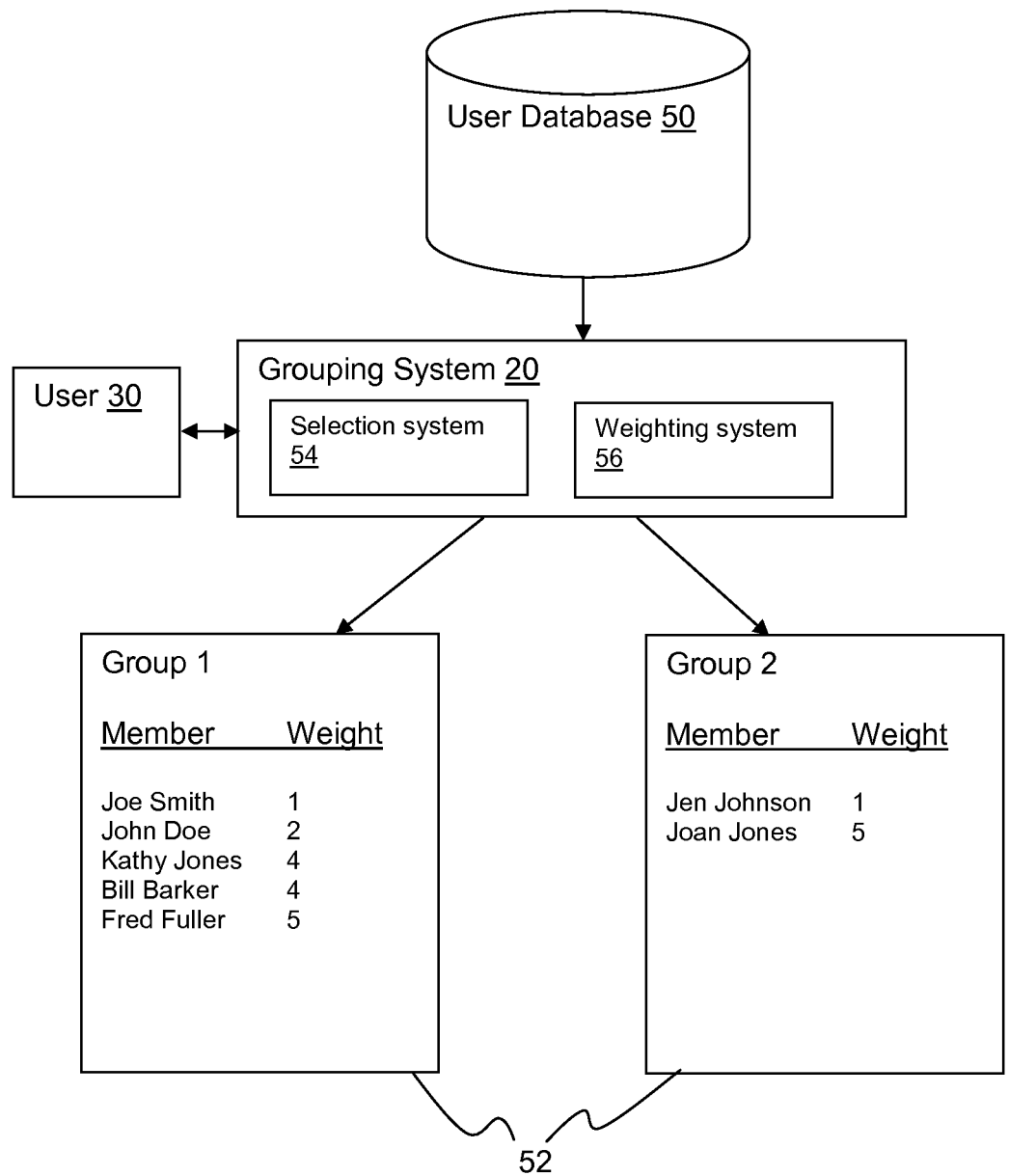
FIG. 3 depicts an overview of a grouping system in accordance with an embodiment of the present invention.

FIG. 3 depicts an overview describing how grouping system 20 may be implemented for selecting and grouping members from a user database 50. User database 50 may comprise any source or collection of sources of information on users, e.g., a company directory, an electronic address book, a contacts list, a list of social networking friends, etc. In an illustrative scenario, user 30 can define a group having members with related interests. For instance, an employee may define a group that includes other employees having similar job responsibilities, or other employees that are on the same team; in a social setting, a user 30 may define a group having similar profiles; etc.

Grouping system 20 provides a selection system 54 for allowing user 30 to manually or automatically select and group members from the user database 50 into one or more groups 52. For instance, a drop down dialog could be provided that allows user 30 to select members from the user's address book. Additionally, selection system 54 can incorporate an automated process that builds groups 52 based on a predefined criteria, e.g., people in the same role or position in a company, team members, social networking friends, etc. In this case, people could be automatically assigned to one or more defined groups.

Grouping system 20 also includes a weighting system 56 that allows user 30 to weight an importance of members within a group 52. For instance, in Group 1, Joe Smith may be the user's immediate supervisor, so user 30 may weight him highest (weight=1). Conversely, Fred Fuller may have a different role than user 30, so a lower weight (weight=5) may be applied.

In a further embodiment, in the case where multiple groups 52 are defined, groups may be given a relative weighting, e.g., regarding how important user 30 values each group. For instance, Group 1, made up of developers, may be given a higher weighting than Group 2, made up of a sales team, because, e.g., the user 30 is a developer. Further, different groups could be given different weights or associations for different applications. For instance, user 30 may have a first group defined for a work-based IDE and a second group defined for a social networking site.

Referring again to FIG. 1, once the group is defined, behavior analysis system 22 automatically collects behaviors 34 of the members 33 in each group. Behaviors 34 may include any type of interaction with a configurable interface 28. For instance, behavior analysis system 22 may examine how each member 33 of a group configures visual objects 38 in their respective configurable interface 28, e.g., how each user arranges portlet windows in a portlet page; how a user sets up windows in an IDE; how each user clicks through pages or links; how often a user views a page, such as a help page; how items are edited, etc. Behaviors 34 tracked for group members 33 by behavior analysis system 22 may comprise any type of information (e.g., configuration information, counts, etc.) and be stored in any manner, e.g., a table, a database, etc.

In addition, behaviors can be analyzed based on time. For instance, behavior analysis system 22 may consider only actions of group members 33 occurring within the last week, or assign a higher priority on more recent activities.

Prioritization system 24 prioritizes visual objects 38 for configurable interface 28 based on: (1) the behaviors 34 collected for members 33 of one or more groups; and (2) the weightings assigned to members 33 of the groups (as well as weightings assigned to groups themselves). Any algorithm that accounts for behaviors and weightings of group members 33 could be utilized to prioritize visual objects 38. For instance, if most members of a social group placed a "local news" portlet window and a "sports news" portlet window at the top of a portal interface, then prioritization system 24 can assign a higher priority to the local news and sports portlet windows. The priority calculation can be further refined based on the weights assigned to each member 33 of a group. For instance, if user 30 assigned a high weight to a first member and a low weight to a second member, prioritization system 24 would prioritize the first member's behaviors 34 greater than the second member's behaviors 34. Thus, if the first member put "sports news" first at the top of the portal page, and the second member put "local news" first at the top of the portal page, then "sports news" would be given a higher priority. Prioritization system 24 can evaluate any collected behaviors 34 as part of the prioritization process, such as the number of times members of the group clicked on links, viewed photos, edited data, etc.

Note that because user 30 weights members 33 of the group according to their own perceived relevance, different members 33 of a group will end up with different priorities assigned to the available visual objects 38. Thus, members of the same group will not necessarily have the same arrangement of visual objects 38.

Once priorities of the visual objects 38 for user 30 are established, configuration system 26 can build and store configuration data. The configuration data is read by the configurable interface 28 and dictates how the visual objects 38 should appear. The use of configuration data for implementing this feature is known in the art, and therefore not further discussed.

Figure 4:
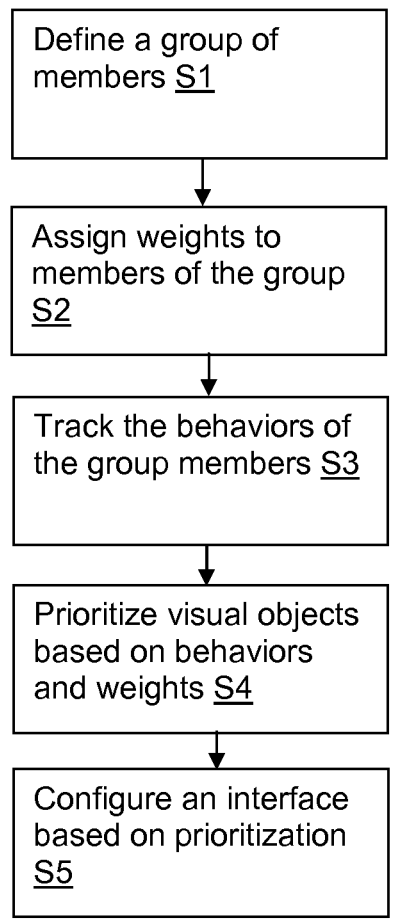
FIG. 4 depicts a flow diagram of a method of configuring an interface in accordance with an embodiment of the invention.

Referring to FIG. 4, a flow diagram is shown for implementing an embodiment of the invention. At S1, a user defines a group of members, and at S2, the user assigns weights to the members. As noted above, S1 and S2 could be done manually by the user, or be automatically implemented on behalf of the user. At S3, behaviors of the group members are tracked and collected. At S4, visual objects for a configurable interface are prioritized based on the behaviors and weights. At S5, the configurable interface is configured automatically for the user.

Thus, for instance, when a new developer joins a new development team, a web-based IDE can automatically set the portal view element priorities based on the preferences of members of the same team. Accordingly, the new developer does not have to do the initial setup/customization of the interface such as viewing defects pertaining to his or her product, configuring the portlet to check in code, or configuring the portlet to view project status and plan. During the project development cycle, most developers need to maximize the portlet to check in code which would increase the priority of the code portlet, or minimize the project status which would lower the priority of the status portlet. Therefore, the solution adjusts the portlet priorities based on the developer community preferences over time.

Referring to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a handheld device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a visual object processing system 18 could be created, maintained and/or deployed by a service provider that offers the functions described herein for customers. That is, a service provider could offer to deploy or provide the ability to prioritize visual objects as described.

It is understood that in addition to being implemented as a system and method, the features may be provided as a program product stored on a computer-readable medium, which when executed, enables computer system 10 to provide a visual object processing system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A visual object processing system for prioritizing visual objects for a configurable interface, comprising:
   a computer hardware system comprising:
      a grouping system for defining a group of members and for assigning weights to members of the group;
      a behavior analysis system for collecting behaviors of the members of the group; and
      a prioritization system for prioritizing visual objects based on the collected behaviors and weights assigned to the members of the group, wherein
   the grouping system includes a user interface for selecting members from a database of users.

2. The visual object processing system of claim 1, wherein the user interface includes a mechanism for assigning a weight to the group and for assigning weights to members of the group.

3. The visual object processing system of claim 1, wherein the behavior analysis system tracks data regarding how the visual objects are configured for other members of the group.

4. The visual object processing system of claim 1, further comprising
a configuration system for generating configuration data for configuring visual objects within the configurable interface.

5. The visual object processing system of claim 1, wherein the configurable interface comprises a portal, and the visual objects include at least one portlet window.

6. The visual object processing system of claim 1, wherein the configurable interface comprises an integrated development environment (IDE) and the visual objects include at least one window within the IDE.

7. A method of prioritizing visual objects for a configurable interface, comprising:
defining a group of members and assigning weights to members of the group using a computing device;
collecting behaviors of the members of the group;
prioritizing visual objects based on the collected behaviors and weights assigned to the members of the group; and
providing the visual objects for display on a display device, wherein
the group is defined via a user interface by a user.

8. The method of claim 7, wherein
the weights are assigned either automatically or via the user interface by the user.

9. The method of claim 7, wherein
the behaviors include data regarding how the visual objects are configured for other members of the group.

10. The method of claim 7, further comprising
generating configuration data that can be utilized to configure visual objects within the configurable interface.

11. The method of claim 7, wherein
the configurable interface comprises a portal and the visual objects include at least one portlet window.

12. The method of claim 7, wherein
the configurable interface comprises an integrated development environment (IDE) and the visual objects include at least one window within the IDE.

13. A computer program product comprising:
a computer usable storage device having stored therein a computer usable program code for prioritizing visual objects for a configurable interface, the computer usable program code, which when executed by a computer hardware system, causes the computer hardware system to perform:
defining a group of members and assigning weights to members of the group;
collecting behaviors of the members of the group; and
prioritizing visual objects based on the collected behaviors and weights assigned to the members of the group, wherein
the defining the group of members includes a user interface for selecting members and assigning weights to members, and
the computer usable storage device is not a transitory, propagating signal per se.

14. The computer program product of claim 13, wherein
the behaviors include data regarding how the visual objects are configured for other members of the group.

15. The computer program product of claim 13, wherein the computer usable program code further causes the computer hardware system to perform
generating configuration data for configuring visual objects within the configurable interface.

16. The computer program product of claim 13, wherein
the configurable interface comprises a portal and the visual objects include at least one portlet window.

17. The computer program product of claim 13, wherein
the configurable interface comprises an integrated development environment (IDE) and the visual objects include at least one window within the IDE.

* * * * *